United States Patent
Vashro

(10) Patent No.: US 6,550,709 B2
(45) Date of Patent: Apr. 22, 2003

(54) FLY FISHING REEL WITH SPHERICAL DRAG SYSTEM

(75) Inventor: Michael Vashro, Boise, ID (US)

(73) Assignee: Native Reels, Boise, ID (US)

( * ) Notice: Subject to any disclaimer, the term of this patent is extended or adjusted under 35 U.S.C. 154(b) by 0 days.

(21) Appl. No.: 09/832,682

(22) Filed: Apr. 10, 2001

(65) Prior Publication Data

US 2001/0038053 A1 Nov. 8, 2001

Related U.S. Application Data

(60) Provisional application No. 60/195,949, filed on Apr. 10, 2000.

(51) Int. Cl.$^7$ .............................................. A01K 89/02
(52) U.S. Cl. ..................... 242/295; 242/317; 242/321
(58) Field of Search ................. 242/290, 285, 242/295, 303, 317, 318, 321

(56) References Cited

U.S. PATENT DOCUMENTS

| | | | | |
|---|---|---|---|---|
| 728,717 A | * | 5/1903 | Hunter | 242/260 |
| 2,142,967 A | * | 1/1939 | Russell | 242/319 |
| 2,257,023 A | * | 9/1941 | Ray | 242/258 |
| 2,347,173 A | * | 4/1944 | Coxe et al. | 242/290 |
| 3,367,598 A | * | 2/1968 | Harrington et al. | 188/187 |
| 4,572,454 A | * | 2/1986 | Furomoto | 242/288 |
| 4,703,902 A | | 11/1987 | Prouza et al. | 242/303 |
| 4,747,810 A | * | 5/1988 | Shepley et al. | 384/192 |
| 4,927,095 A | * | 5/1990 | Young | 242/255 |
| 5,086,991 A | * | 2/1992 | Johansson | 242/290 |
| 5,407,144 A | * | 4/1995 | Ryall | 242/295 |
| 5,482,221 A | | 1/1996 | Peterson et al. | 242/285 |
| 5,590,847 A | * | 1/1997 | Ament | 242/317 |
| 5,615,840 A | * | 4/1997 | Bushnell et al. | 242/301 |
| 5,626,303 A | | 5/1997 | Bringsen | 242/265 |
| 5,915,639 A | | 6/1999 | Farris | 242/295 |
| 5,921,492 A | | 7/1999 | Bauer | 242/317 |
| 6,053,445 A | | 4/2000 | Farris | 242/303 |
| 6,073,871 A | | 6/2000 | Farris et al. | 242/295 |
| 6,152,389 A | | 11/2000 | Kim | 242/260 |
| 6,209,815 B1 | * | 4/2001 | Collier | 242/303 |
| 6,267,312 B1 | * | 7/2001 | Farris et al. | 242/246 |

* cited by examiner

Primary Examiner—Emmanuel Marcelo
(74) Attorney, Agent, or Firm—Pedersen & Co., PLLC; Ken J. Pedersen; Barbara S. Pedersen

(57) ABSTRACT

The fly fishing reel of this invention comprises a housing that includes a mounting shoe for attaching the reel to a fishing rod, a hub attached axially to the center of the housing, a spool containing a centrally mounted spindle supported within the hub, and an adjustable, highly effective and efficient drag system coupled between the spool and housing. The drag system is a unidirectional variable friction brake that includes a first and second inner bearing races and first and second outer bearing races. The inner bearing races each have convex hemispherical friction surfaces. The outer bearing races each have concave hemispherical friction surfaces. The outer races are rotationally fixed by interlocking geometry with the hub. The inner races encase a unidirectional roller clutch which receives the spindle attached to the spool. The hemispherical friction surfaces are longitudinally concentric with the rotational axis of the spindle. To increase the friction between the inner and outer races, an adjustable compression member is rotated to axially translate the first outer race toward the inner race. In this manner the hemispherical friction surfaces are forced to bear against one another. This friction results in variable drag on the rotation of the spool.

4 Claims, 4 Drawing Sheets

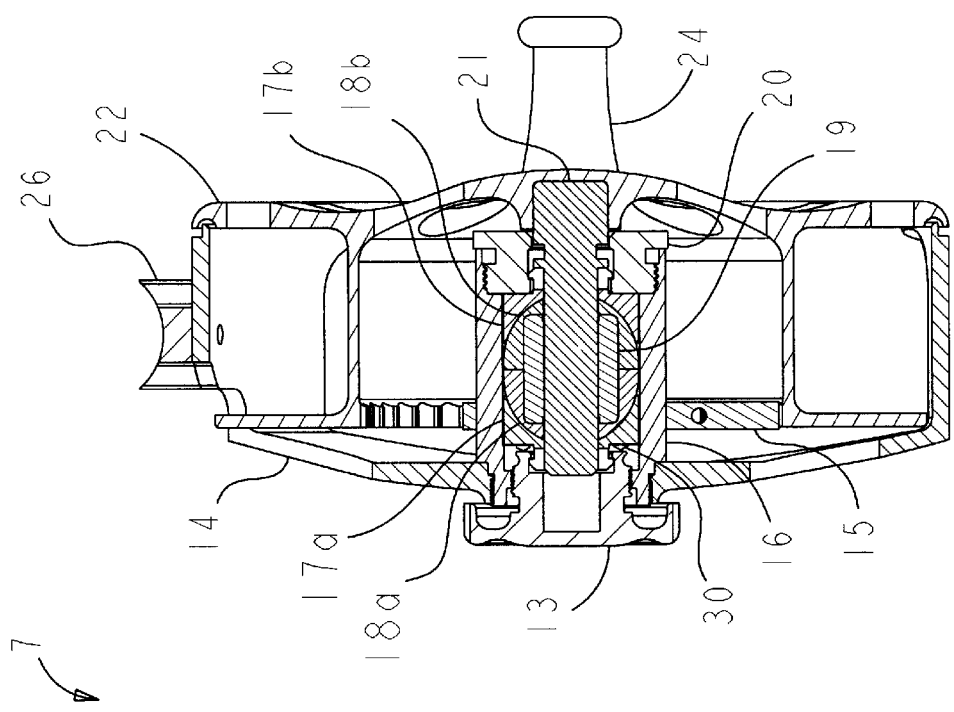
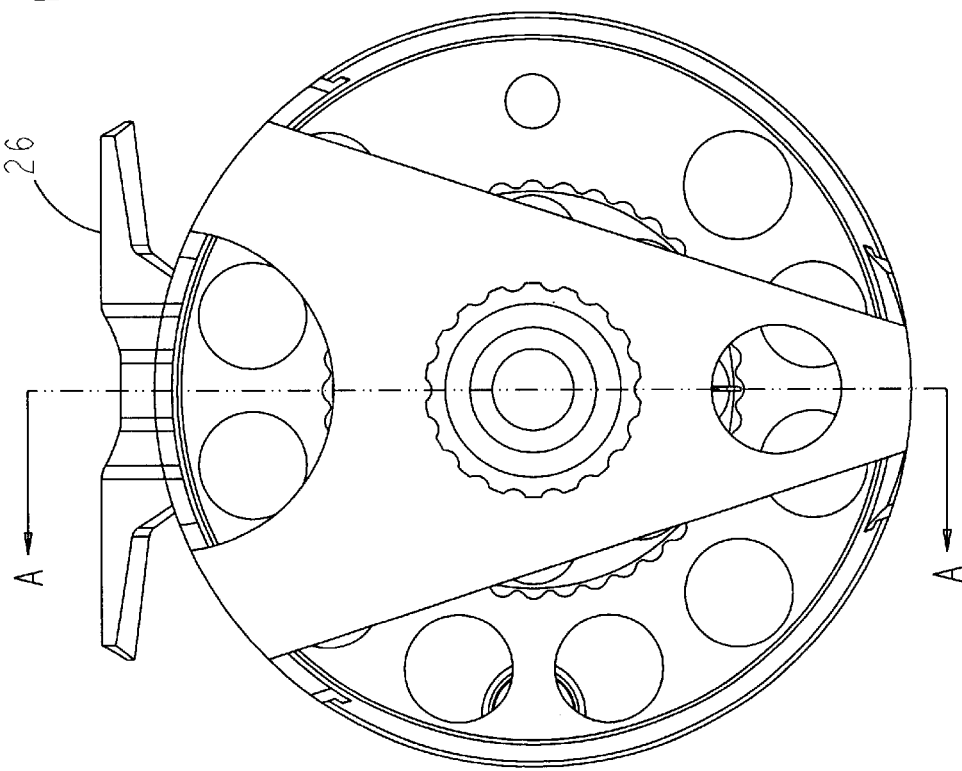

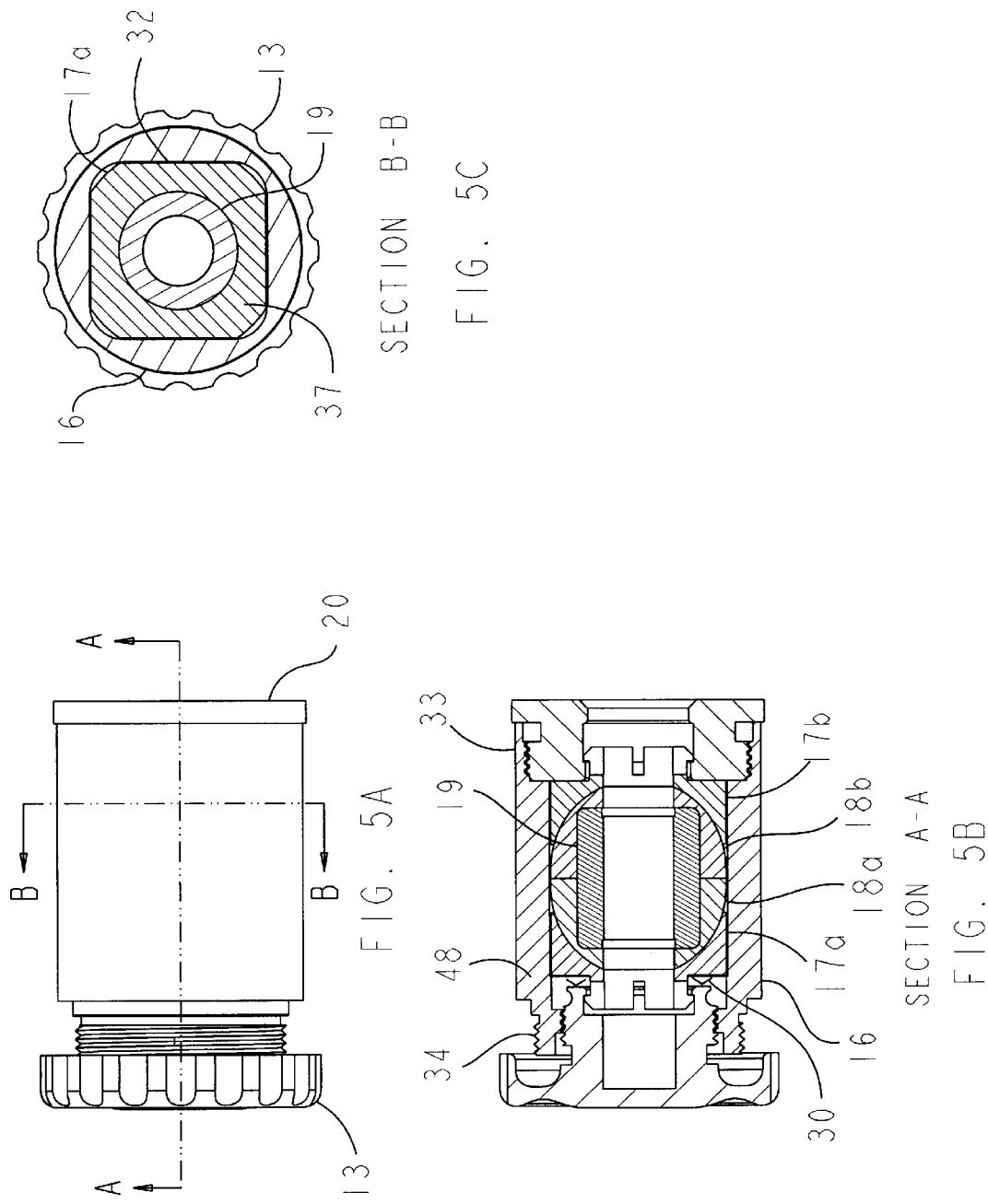

FLY FISHING REEL WITH SPHERICAL DRAG SYSTEM

This application claims priority of applicant's provisional application entitled "Fly Fishing Reel with Spherical Drag System", No. 60/195,949, filed on Apr. 10, 2000, now abandoned, which is being incorporated herein by reference.

BACKGROUND OF THE INVENTION

1. Field of the Invention.

This invention relates to the fly fishing reels, and more particularly to an innovative and improved fly-fishing reel drag system.

2. Related Art.

Fly fishing equipment includes a fly rod fitted with a reel, the rod providing the angler the ability to cast an artificial fly that is attached to the free end of the fly-line wound on the reel. Reels are typically comprised of a spool for winding the fly-line for storage and a housing to guide the line during casting and reeling in. The housing also provides a means for securing the reel to the fly rod. The reel also provides a means for freely releasing the line during casting, a means for retrieving the line and frequently a means for controlling the tension in the fly-line after hook-up with a fish. The controlled tension, or extraction resistance, is known as "drag".

Artificial flies typically comprise a hook, hackle and thread. The fly is usually assembled in a way so as to resemble a variety of insects. The fly line is usually made of a light polymer material.

Today's more sophisticated fly-fishing reels are often made by computer controlled milling and turning equipment. Components of the reel are typically machined from lightweight material in order to provide lightweight and durable assemblies. Computer controlled machining equipment allows for easy and precise execution of design features and innovations into the reel components. Such design features and innovations can improve the structure, manufacturability, performance, and esthetics of the fly fishing reel. For example, the weight of the reel may be matched with that of the line and rod to give the angler a balanced system providing an optimal cast and reduced stress on the fisherman. This is especially important since it is not unusual for a fisherman to perform hundreds of casts during a single day of fishing.

Upon the desired engagement of a fish, the fly line may experience rapid acceleration, which has the potential for snapping the line. To provide for a controlled transition of the line from its static state to one in which the line is rapidly being extracted from the spool, a controlled resistance means, or a drag system, is used. The drag system should be capable of providing a range of adjustment from almost no resistance so that the line may free-spool to resisting the torque applied to the reel by a large aggressive fish in a strong flowing current. A drag system must easily transition from a static state to a kinetic state upon the application of torque from a line being extracted. A drag system should require a very minimal additional torque to overcome the static friction and mass inertia of the reel compared to the torque required during the kinetic state.

Numerous inventors have provided many devices to improve fly fishing equipment and to enhance the enjoyment of the angler. For example, Bauer (U.S. Pat. No. 5,921,492) describes a drag system incorporating a drag plate. The friction surface of the plate extends outward on a plane perpendicular to the axis of rotation. One consequence of this approach is that the average radius of the friction surface is relatively large which results in a start-up torque that is higher than the running torque. A high start-up torque is undesirable because the adjustment of a lightly set drag can be difficult to balance with the need to prevent the line from spooling up, or "back lashing". Of course a high start-up torque requires a higher applied force to initiate rotation. The potential result of this is a tangled line resulting from the spool rotating with a higher velocity that the rate at which line is being extracted.

Farris (U.S. Pat. No. 5,915,639) addresses start-up torque requirements by positioning the drag system's friction surface into a conical shape near the axis of rotation of the spool. This design, having addressed the start-up inertia problem, yields itself to being susceptible to non-axial loading resulting in inconsistent drag. Non axial loading occurs when the spindle encounters a torque, for example when the line is being extracted from the spool. The spindle support is required to maintain the stability of the spool along the axis of rotation as well as preventing any rotation about an axis non-coaxial to the spindle. This may be referred to as wobbling of the spool. The introduction of wobbling changes the performance of the drag system. The conical surface that is symmetrical about the axis of the spindle is forced to act as a secondary spindle support. Requiring the primary friction surfaces to support the spindle introduces non-uniform distribution of the applied load. This may potentially result in varying the effects of the friction surfaces. In addition to the effects of the drag felt on the line, the problem introduces a potential for non-uniform wear of the primary friction surfaces. Furthermore, this design approach incorporates a very large number of small and intricate So components that increase manufacturing costs and require precise and thorough lubrication. This complexity increases susceptibility of the drag mechanism to damage from contamination and potentially improper operation. The intricacy of the Farris design also makes it nearly impossible for the angler to clean and/or repair the reel in the field.

Farris, in a more recent patent, (U.S. Pat. No. 6,053,445) addresses the result of inconsistent drag by providing a compliant support to the outer conical race to provide a flexible fit to the inner conical race. This is accomplished by having the conical outer race ride on o-rings within the housing. Although this design reduces the effects of the unstable spool, it does not address the significant shortcomings described above that result from incorporation of a conical friction surface into the spindle support.

Thus it is a primary object of this invention to provide a fly-fishing reel having a drag system that has minimal start-up inertia and completely separates and isolates the drag surfaces from supporting a non-axially loaded spool assembly. It is a further object of this invention to improve the manufacturability and reduce the cost of the drag system of fly fishing reels by making multiple use of like components. It is yet another object of this invention to significantly reduce the number and intricacy of the components of a drag system. It is another object of this invention to provide a drag system that is easily accessed for preventative maintenance procedures or for cleaning or repair in the field.

SUMMARY OF THE INVENTION

The fly fishing reel of this invention comprises a housing that includes a mounting shoe for attaching the reel to a fishing rod, a hub attached axially to the center of the housing, a spool containing a centrally mounted spindle supported within the hub, and an adjustable, highly effective and efficient drag system coupled between the spool and housing.

The drag system is a unidirectional variable friction brake that includes first and second inner bearing races and first and second outer bearing races. The inner bearing races have each have convex hemispherical friction surfaces. The outer bearing races each have concave hemispherical friction surfaces. The outer races are rotationally fixed by interlocking geometry with the hub. The inner races encase a unidirectional roller clutch, which receives the spindle attached to the spool. The hemispherical friction surfaces are longitudinally concentric with the rotational axis of the spindle.

To increase the friction between the inner and outer races, an adjustable compression member is rotated to axially translate the first outer race toward the inner race. In this manner the hemispherical friction surfaces are forced to bear against one another. This friction results in variable drag on the rotation of the spool.

The roller clutch disposed between the spindle and the inner bearing race produces the desired unidirectional drag function. In the "reeling in" direction, the roller clutch enables the spindle to rotate freely such that the inner and outer bearing races and their hemispherical friction surfaces do not rotate relative to each other. In the "line out" direction, the roller clutch locks causing rotation between the races and friction surfaces, thus creating frictional drag against the rotation of the spool.

Every aspect pertaining to the manufacturing and assembly of the components of this invention was a prime consideration throughout the design process for the subject reel. For example identical components are used in many cases (e.g. inner and outer bearing races). The number of components has been minimized, for example the drag system has only 9 parts. The inner and outer bearing races may be manufactured from common industry materials. In the preferred embodiment, the outer bearing races are made from a polymer, preferably acetal, for example Delrin AF™. Preferably, the bearing retainer is also made from the same polymeric material. The inner bearing races are made of a relatively soft, self-lubricated material such as bronze, for example, Oilite 454™. The housing, the spool, the hub, the compression member are preferably formed from an industry standard aluminum alloy such as 6020.

These and many other features and attendant advantages of the invention will become apparent as the invention becomes better understood by reference to the following detailed description and accompanying drawings.

BRIEF DESCRIPTION OF THE DRAWINGS

FIG. 3 is a side view of the preferred embodiment of this invention.

FIG. 4 a cross-sectional view along line A—A in FIG. 3.

FIGS. 5A, 5B and 5C provide detailed views of the assembled drag system of this invention.

DESCRIPTION OF THE PREFERRED EMBODIMENTS

Figure 1:
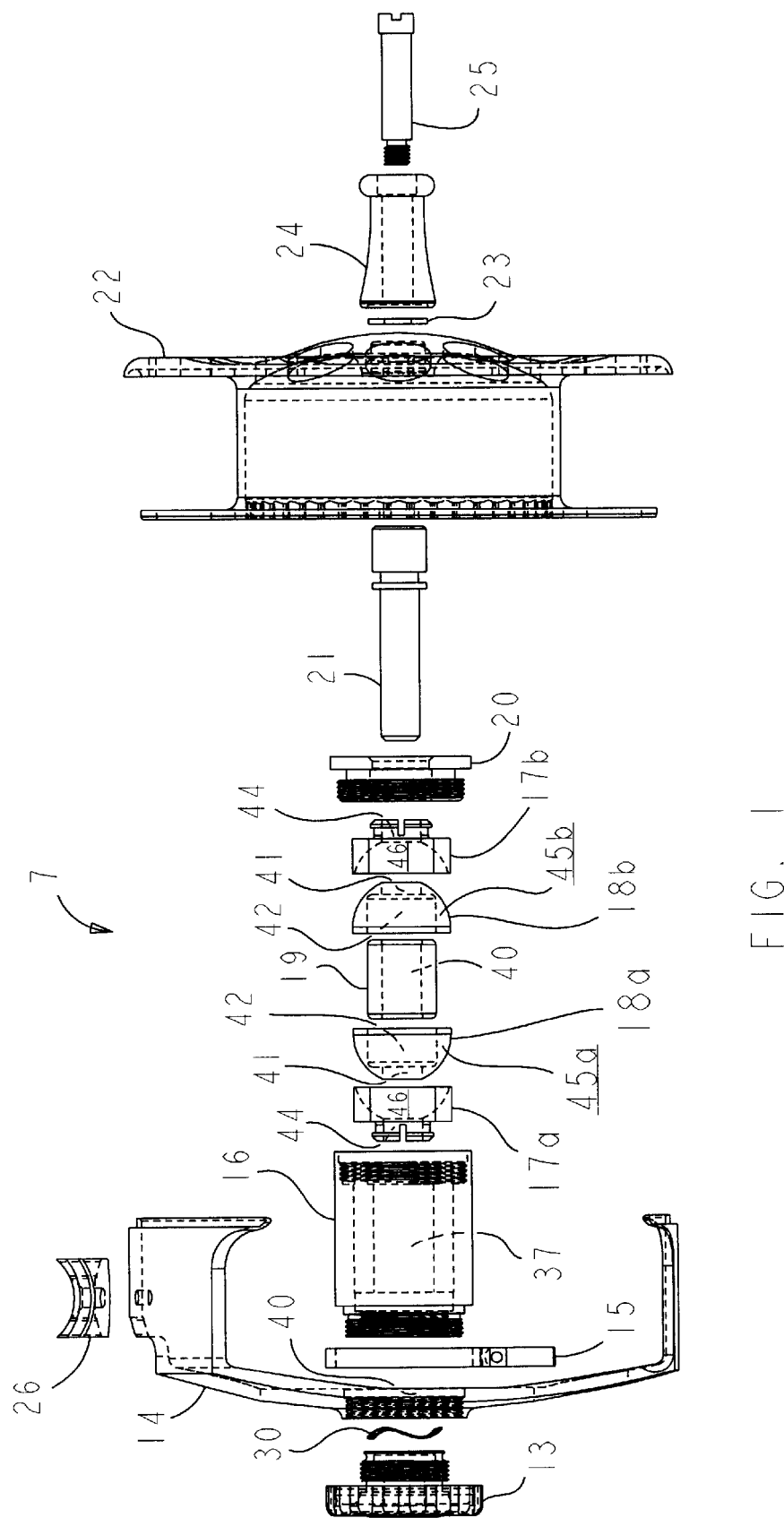
FIG. 1 is an exploded view of the preferred embodiment of this invention.
Figure 2:
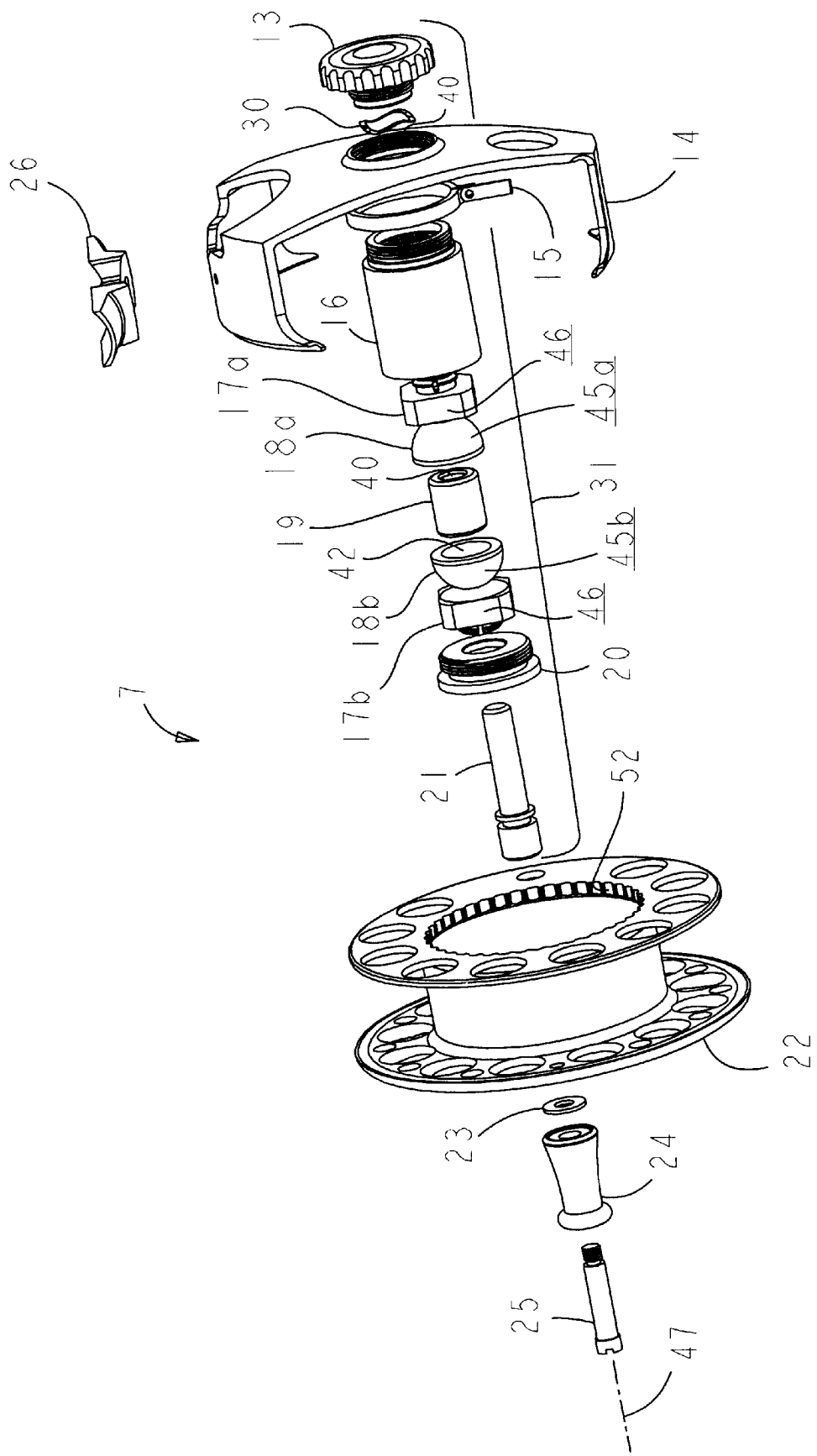
FIG. 2 is an exploded isometric view of the preferred embodiment of this invention.

With reference to FIGS. 1 and 2, the preferred embodiment of the fly fishing reel of this invention 7 comprises housing 14 having internally threaded central axial hole 40 and mounting shoe 26. The reel further includes spool 22 having an axis of rotation 47 and spindle 21 aligned with, and co-axial with, the axis of rotation. Drag system 31 is co-axially disposed on spindle 21 and includes hub 16 fixedly attached to housing 14, adjustable compression member 13, removable bearing retainer 20, unidirectional roller clutch 19 and identical first and second inner bearing races 18a, 18b and identical first and second outer bearing races 17a, 17b.

Referring now to FIGS. 5A, 5B and 5C, hub 16 has outer end 34, central section 48 and inner end 33. Outer end 34 has an externally threaded section and internally threaded section. Central section 48 and inner end 33 include longitudinal internal cavity 37. The central section of the internal cavity has a generally square cross-section, the inner end is internally threaded and the external surface is cylindrical.

Referring again to FIGS. 1 and 2, hemispherical friction surfaces 45a and 45b of the first and second inner races 18a, 18b are convex. The first and second inner bearing races 18a, 18b each has axial bore 41 and axial recess 42. The axial bore 41 is for receiving spindle 21. The axial recesses fixedly contain unidirectional clutch 19 that also has axial bore 40.

Referring once again to FIGS. 2, 5A, 5B and 5C, hemispherical friction surfaces 43a and 43b of first and second outer races 17a, 17b are concave. Races 17a, 17b also have axial bore 44 and a generally square (with chamfered corners) external surface, 46. First outer bearing race 17a is rotationally fixed within the generally square cavity 37 of hub 16. Removable bearing retainer 20 rotatably retains second outer bearing race 17b.

Continuing reference to FIGS. 2, 5A, 5B and 5C, outer end 34 of the hub is threadably received by the central axis bore of the housing. Adjustable compression member 13 is threadably connected to the internal threads of the outer end 34 of the hub 16. Convex hemispherical friction surface 45a of first inner bearing race 18a butts against concave hemispherical friction surface 43a of first outer bearing race 17a within the internal cavity 37 of the hub. In addition, convex hemispherical friction surface 45b of second inner bearing race 18b butts against concave hemispherical friction surface 43b of second outer bearing race 17b which is retained by removable bearing retainer 20. In the final assembly of the reel, spindle 21 receives the bearing retainer, the second outer bearing race, the unidirectional roller clutch and the first outer bearing race through their respective axial bores. A wave spring washer 30 is disposed on the spindle 21 between the first outer bearing race 17a and the adjustable compression member 13. The spool also has hand crank 24 connected to the spool via means for fastening 25 and shim 23. Reel 7 may optionally include means for clicking comprising interior castellated ring 52 within spool 22 acted upon by clicking arm 15.

To increase the friction between the inner and outer bearing races, the first outer bearing race 17a is translated axially toward inner bearing races 18a,b and the second outer bearing race 17b. This forces hemispherical friction surfaces 43a and 43b and 45a and 45b into contact. Removable bearing retainer 20, attached to housing 14, axially fixes second outer bearing race 17b. Adjustable compression member 13 provides the axial force to translate the first outer bearing race toward the inner bearing race and the second outer bearing race. The amount of friction is increased or decreased by rotatably adjusting the compression member. This adjustable friction results in variable drag on the rotation of spool 22.

To provide for a smooth transition through the variable friction between the several friction surfaces, a wave spring washer 30 is preferably used between the compression member and the first outer bearing race. The wave spring washer provides for a gradual increase of pressure on the hemispherical friction surfaces as the compression member is rotated. This gradual and precisely controlled increase in friction results in a very smooth increase (or decrease) of drag on the rotation of the spool.

Referring again to FIGS. 1 and 2, to produce a unidirectional drag mechanism, roller clutch 19 is disposed between spindle 21 and inner bearing races 18a,b. The exterior surface of roller clutch 19 is fixed within axial bores 41, 44 of inner bearing races 18a,b. In the "reeling in" direction, the roller clutch enables the spindle to rotate freely such that the inner bearing races and the outer bearing races do not rotate relative to each other. In the "line out" direction, the roller clutch locks causing rotation of the inner bearing races with respect to the outer bearing races. This creates frictional drag between the hemispherical frictional surfaces and thus frictional drag on the rotation of the spool.

Every aspect pertaining to the manufacturing and assembly of the components of this invention was a prime consideration throughout the design process. For example identical components are used in many cases (inner and outer bearing races). The number of components has been minimized, for example the drag system has only 9 parts. The inner and outer bearing races 18a,b and 17a,b may be manufactured from common industry materials. In the preferred embodiment, the outer bearing races are made from a polymer, preferably acetal, for example, Deirin AF™. The bearing retainer 20 is also made from the same polymeric material. The inner bearing races are made of a relatively soft, self-lubricated material such as bronze, for example, Oilite 454™. The housing, the spool, the hub, and the compression member are preferably formed from an industry standard aluminum alloy such as 6020.

Although this invention has been described above with reference to particular means, materials and embodiments, it is to be understood that the invention is not limited to these disclosed particulars, but extends instead to all equivalents within the scope of the following claims.

I claim:

1. A fly fishing reel comprising:

a housing having an internally threaded central axial hole, said housing further having a mounting shoe, a spool having an axis of rotation, said spool further having a spindle aligned and co-axial with the axis of rotation, and a drag system co-axially disposed on the spindle of said spool, said drag system having a hub fixedly attached to said housing, an adjustable compression member, a removable bearing retainer, a unidirectional roller clutch, identical first and second inner bearing races and identical first and second outer bearing races, each bearing race having a hemispherical friction surface.

2. A fly fishing reel according to claim 1 wherein:

the hub has an outer end, a central section and an inner end, the outer end having an externally threaded section and an internally threaded section, the central section and inner end including a longitudinal internal cavity, the cavity within the central section having a generally square cross-section and the inner end being internally threaded, said hub further having a cylindrical external surface, the first and second inner bearing races each have an axial bore and an axial recess, the axial recesses fixedly containing the unidirectional clutch, said clutch further having an axial bore, the hemispherical friction surfaces of the first and second inner races of said drag system are convex, the first and second outer bearing races each have an axial bore and a generally square external surface, the hemispherical friction surfaces of the first and second outer races of said drag system are concave, and the first outer bearing race being fixedly retained within the generally square cavity of the hub and the second outer bearing race being rotatably retained by the removable bearing retainer.

3. A fly fishing reel according to claim 2 wherein;

the outer end of the hub is threadably received by the central axis bore of the housing, the adjustable compression member is threadably connected to the internal threads of the outer end of said hub, the convex hemispherical friction surface of the first inner bearing race is butted against the concave hemispherical friction surface of the first outer bearing race within the internal cavity of said hub, the convex hemispherical friction surface of the second inner bearing race is butted against the concave hemispherical friction surface of the second outer bearing race retained by the bearing retainer, and the spindle of said spool receiving the bearing retainer, the second outer bearing race, the unidirectional roller clutch and the first outer bearing race through their respective axial bores.

4. The fishing reel of claim 3 wherein said drag system further includes a wave spring washer on the spindle disposed between the first outer bearing race and the adjustable compression member.

* * * * *